United States Patent [19]

El-Menshawy

[11] Patent Number: 4,950,860

[45] Date of Patent: Aug. 21, 1990

[54] ELECTRO-DISCHARGE MACHINING APPARATUS

[75] Inventor: Mohamed F. El-Menshawy, Birmingham, England

[73] Assignee: Spark Tec Limited, Birmingham, England

[21] Appl. No.: 167,268

[22] Filed: Mar. 11, 1988

[30] Foreign Application Priority Data

Mar. 14, 1987 [GB] United Kingdom ............... 8706091

[51] Int. Cl.⁵ .................. B23H 1/02; B23H 9/04; B23H 7/32
[52] U.S. Cl. .................. 219/69.18; 219/69.11; 219/69.15; 219/69.16
[58] Field of Search ............... 219/69 G, 69 E, 69 V, 219/69 M, 69 P, 69 R, 69.16, 69.15, 69.2, 69.17, 69.18, 69.11

[56] References Cited

U.S. PATENT DOCUMENTS

| 2,783,411 | 2/1957 | Matulaitis | 219/69 G |
| 3,509,305 | 4/1970 | Bertolasi | 219/69 P |
| 3,655,936 | 4/1972 | Saito et al. | 219/69 P |
| 3,655,937 | 4/1972 | Ullmann et al. | 219/69.18 |
| 4,221,952 | 9/1980 | Sato et al. | 219/69 G |
| 4,233,485 | 11/1980 | Sato et al. | 219/69 V |
| 4,287,403 | 9/1981 | Sato et al. | 219/69 G |
| 4,683,364 | 7/1987 | Anderson | 219/69 G |

FOREIGN PATENT DOCUMENTS

| 54-32897 | 3/1979 | Japan | 219/69 M |
| 101332 | 8/1980 | Japan | 219/69 C |
| 2024077A | 1/1980 | United Kingdom | |
| 372049 | 5/1973 | U.S.S.R. | 219/69.18 |
| 569422 | 8/1977 | U.S.S.R. | 219/69.18 |

Primary Examiner—A. D. Pellinen
Assistant Examiner—Geoffrey S. Evans
Attorney, Agent, or Firm—Nixon & Vanderhye

[57] ABSTRACT

An electro-discharge machining apparatus includes an electrode carrier on which there are mounted a plurality of separate electrodes. A circuit for each electrode applies a high voltage discharge initiating pulse followed by an extended lower voltage discharge sustaining pulse to the associated electrode. A gap voltage sampling circuit samples the voltage between the electrode and the workpiece and a "low wins" circuit passes a signal representing the lowest gap voltage as a feedback signal for a servo-actuator which moves the electrode holder towards and away from the workpiece.

16 Claims, 4 Drawing Sheets

ELECTRO-DISCHARGE MACHINING APPARATUS

This invention relates to an electro-discharge machining apparatus and also to a method of performing such machining.

In the steel rolling industry, there is a requirement to provide steel rolls with a rough or textured surface. During rolling, such rolls form a textured surface on steel strips and such a surface plays an important role during subsequent processing operations. For example, when making panels for the automotive industry, the texture of the steel strip influences the behaviour of the strip during pressing and also the appearance of a final paint finish.

The conventional shot-blast texturing method for steel rolls is difficult to control and so it is difficult to meet the stringent requirement of steel users with this method. There has been proposed an apparatus for texturing steel rolls by electro-discharge machining. This apparatus comprises a line of electrodes mounted at spaced positions along the roll and an individual actuator for each electrode to move the electrode towards and away from the roll so as to achieve the correct gap between the electrode and the roll. The provision of an individual actuator for each electrode ensures that the electrodes adapt to the camber of the roll and satisfactory results are obtained with this apparatus. However, this apparatus suffers from the disadvantage that it requires a large number of actuators which result in the apparatus being complicated and expensive.

It is accordingly an object of this invention to provide a new and improved apparatus for electro-discharge machining and a new method of such machining in which the above mentioned disadvantages are overcome or reduced.

According to one aspect of this invention, there is provided an electro-discharge machining apparatus comprising a support structure mountable for movement along a first axis, at least one electrode holder provided with at least one electrode, the or each electrode holder being mounted for movement relative to the support structure along an associated second axis, an individual actuator for the or each electrode holder, the or each actuator being arranged to move its associated electrode holder along the associated second axis, an electric source for providing current to the or each electrode so as to cause electric discharges to occur, and means responsive to said electric discharges for controlling the or each actuator.

When the apparatus of this invention is used to machine a roll, as the support structure is moved along the length of the roll, the or each electrode holder is moved towards or away from the roll by its associated actuator thereby compensating for the camber of the roll and achieving a correct discharge gap. In comparison with the prior art apparatus, the apparatus of the present invention requires only a single or a relatively few number of actuators.

Preferably, the first axis is at right angles to the or each second axis.

Conveniently, the or each electrode holder is provided with a plurality of electrodes. By providing a plurality of electrodes, the rate of machining is relatively rapid.

Conveniently, there are provided a plurality of electrode holders located at positions which are spaced apart from each other along a third axis which is at right angles to the first and second axes.

The apparatus may form part of a machine which is provided with a bed and means for rotating a roll along its longitudinal axis, said support structure being mounted on the bed for movement along said first axis.

The invention also resides in an electro-discharge machining apparatus for texture machining the surface of metal rolls, comprising a support structure movable in a direction parallel to the axis of a rotatable roll to be machined, at least one electrode holder mounted on said support structure for movement along a path towards and away from the roll, a servo-actuator for moving said electrode holder along said path, a plurality of electrodes mounted on said electrode holder and electrically insulated from one another, a plurality of separate current paths for supplying current to said electrodes from a source for creating separate electrical discharges between said electrodes and the roll surface, voltage detecting means for detecting the voltage of each electrode whilst electrical discharge between the electrodes and the roll is taking place, discharge voltage selection means for selecting the lowest of said voltages and supplying a signal representing said lowest of said voltages as a feedback signal to said servo-actuator, said servo-actuator positioning said electrode holder to cause the feedback signal thereto to approach a desired value, each of said current supply paths comprising discharge initiating pulse generating means and machining pulse generating means for supplying current to the individual electrode at respectively relatively high and low voltages for pulse durations which are relatively short and long respectively.

According to another aspect of this invention there is provided a method of applying electro-discharge machining to a roll using a machine tool, said machine tool comprising means for supporting a roll, a support structure mounted for movement along an axis substantially parallel to the longitudinal axis of the roll, and at least one electrode holder provided with at least one electrode, the or each electrode being mounted on said support structure for movement towards and away from the roll, said method comprising the steps of rotating the roll, applying electric current to the or each electrode so as to cause electric discharges to occur between the or each electrode and the roll, moving the or each electrode towards or away from the roll in accordance with said discharges, and moving said support structure along said axis substantially parallel to the roll.

Figure 1:
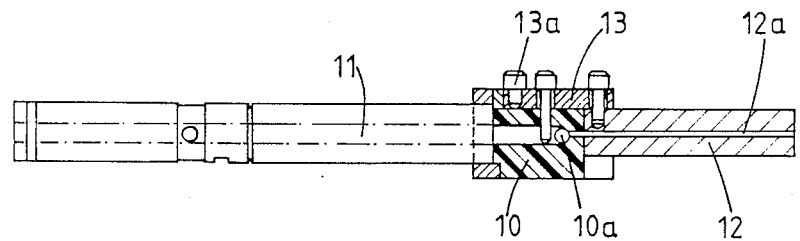
FIG. 1 is a section view of an electrode holder for use in one example of an electro-discharge machining apparatus in accordance with the invention.
Figure 2:
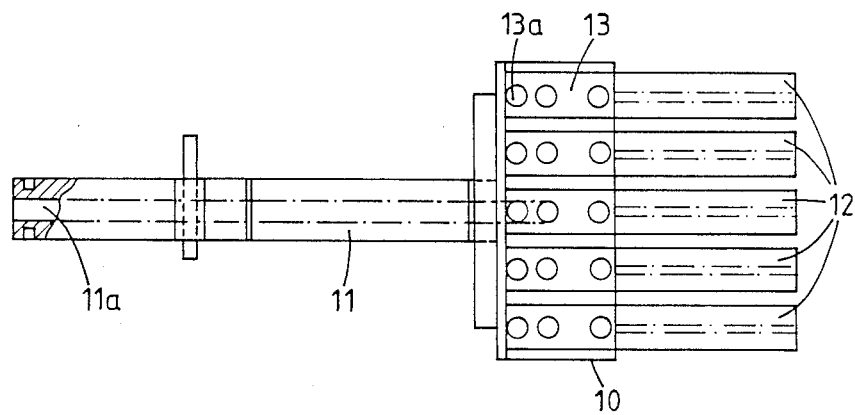
FIG. 2 is a plan view of the electrode holder of FIG. 1.

Referring firstly to FIGS. 1 and 2 the electrode holder includes a body 10 formed of a suitable electrical insulating material (such as "Tufnol" (RTM)). This body is attached to the end of a tubular stem 11. A plurality (in this case five) of separate electrodes 12 are secured to the body 10. These electrodes are formed of a suitable metal (chosen to suit the material of the rolls to be treated) and are secured to the body in such a manner that they do not touch one another. Individual metal mounting plates 13 are used for this purpose and each such plate 13 has a screw terminal 13a thereon for making an individual electrical circuit connection to that electrode.

Each electrode 12 has a longitudinally extending passageway 12a for dielectric liquid supply. This passageway opens on to the end face of the electrode and communicates with a manifold 10a in the body 10. This manifold 10a communicates in turn with the interior 11a of the stem 11.

Figure 3:
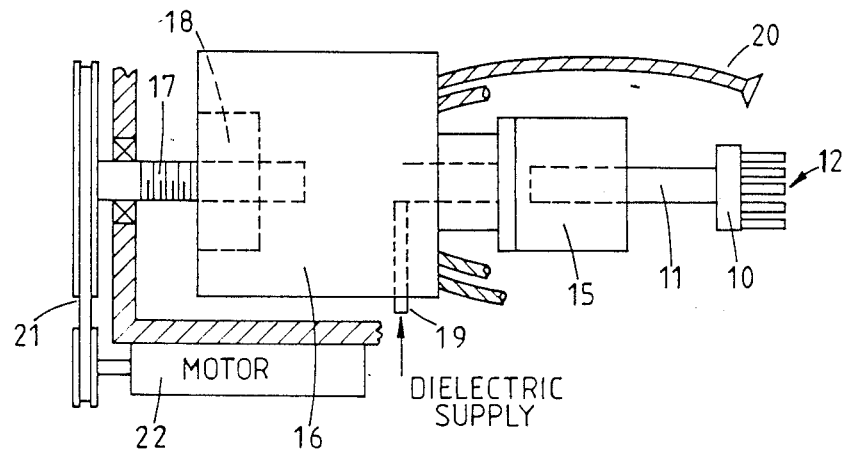
FIG. 3 is a diagrammatic sectional view of an actuator which carries the electrode holder.

Referring now to FIG. 3, a diagrammatic representation of a servo-actuator which is used to displace the electrode holder is shown. The electrode holder stem 11 is fitted into a socket in member 15 which is attached to a block 16 movable by means of a screw 17 and a ball nut 18. The block 16 has a connector 19 through which the dielectric liquid is supplied. The block includes passageways (not shown in detail) which connect this connector to the passage in stem 11 and to four dielectric liquid nozzles 20 which are adjustably mounted on the block 16 to enable the nozzles to be positioned close to the workpiece and provide an adequate flow of dielectric liquid to the working area.

The screw 17 is driven, through a belt drive 21 by a motor 22, the axis of the shaft of which is spaced from and parallel to the axis of the screw 17.

Figure 4:
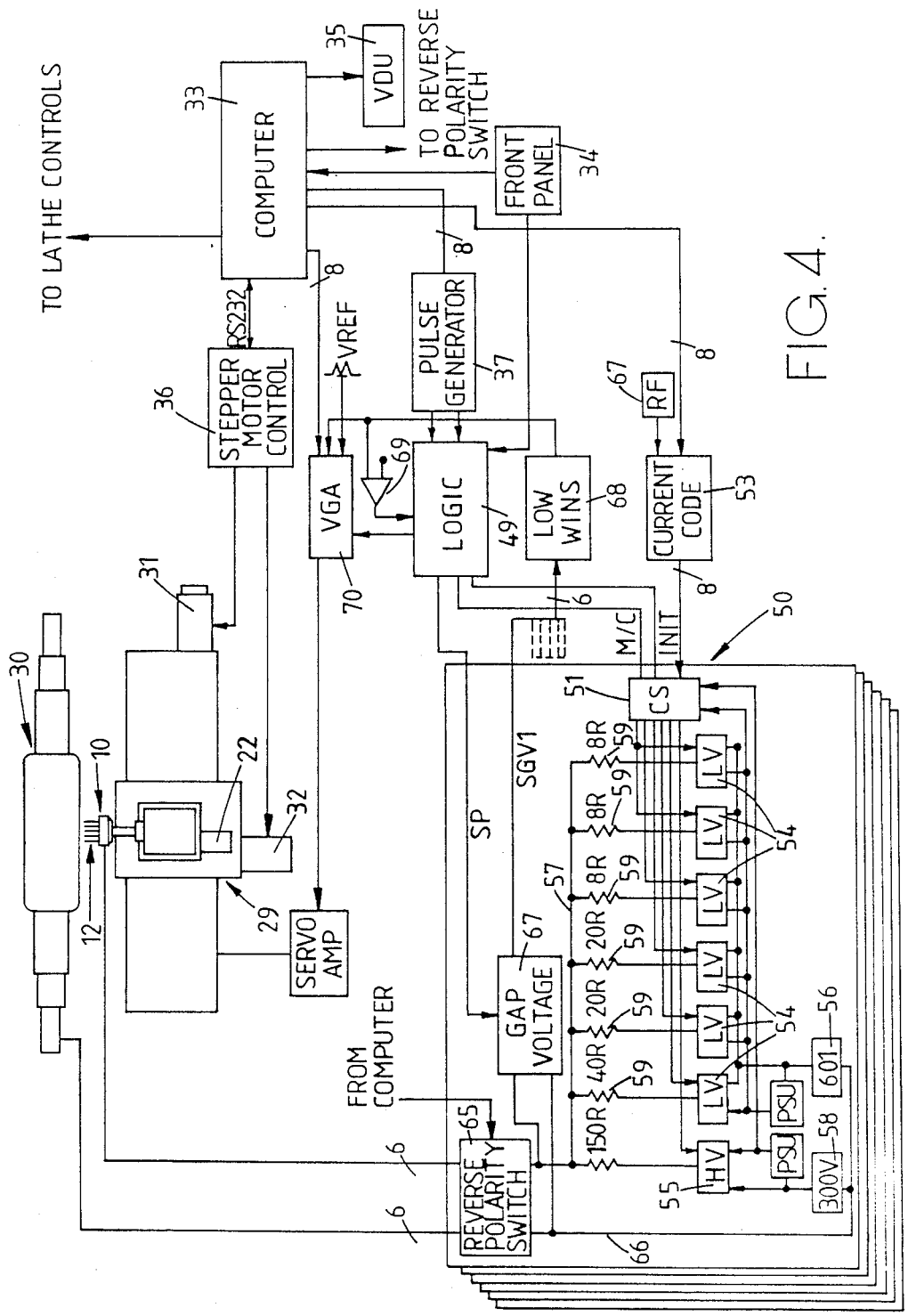
FIG. 4 is a diagram showing the complete apparatus.
Figure 5:
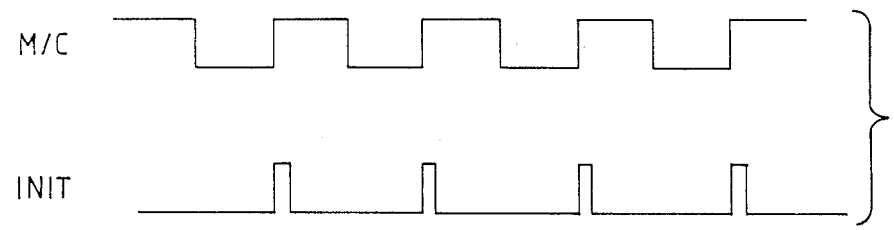
FIG. 5 is a graph showing waveforms of machine and initiation pulses used in the apparatus.

FIG. 4 is an overall diagram of the apparatus. The servo-actuator is mounted on a compound slide 29 on a lathe which has supports (not shown) supporting and rotating a roll 30 to be treated. A stepper motor 31 drives the slide 29 longitudinally of the roll, i.e. in a first direction parallel to the roll axis, and another stepper motor 32 drives the slide 29 towards and away from the roll axis in a second direction perpendicular to the roll axis. The servo-actuator is so mounted that the electrode holder is movable in a direction parallel to said second direction.

Control of the apparatus is effected by means of a computer which receives inputs from a front panel 34 including switches and a keypad and which drives a VDU display 35 if required. The computer provides control signals for the stepper motors 31, 32, via a stepper motor controller 36. It also provides digital signals to control the on and off durations for the electrical discharges, the current level to be applied and the gain of the servo-loop controlling the motor 22.

Figure 6:
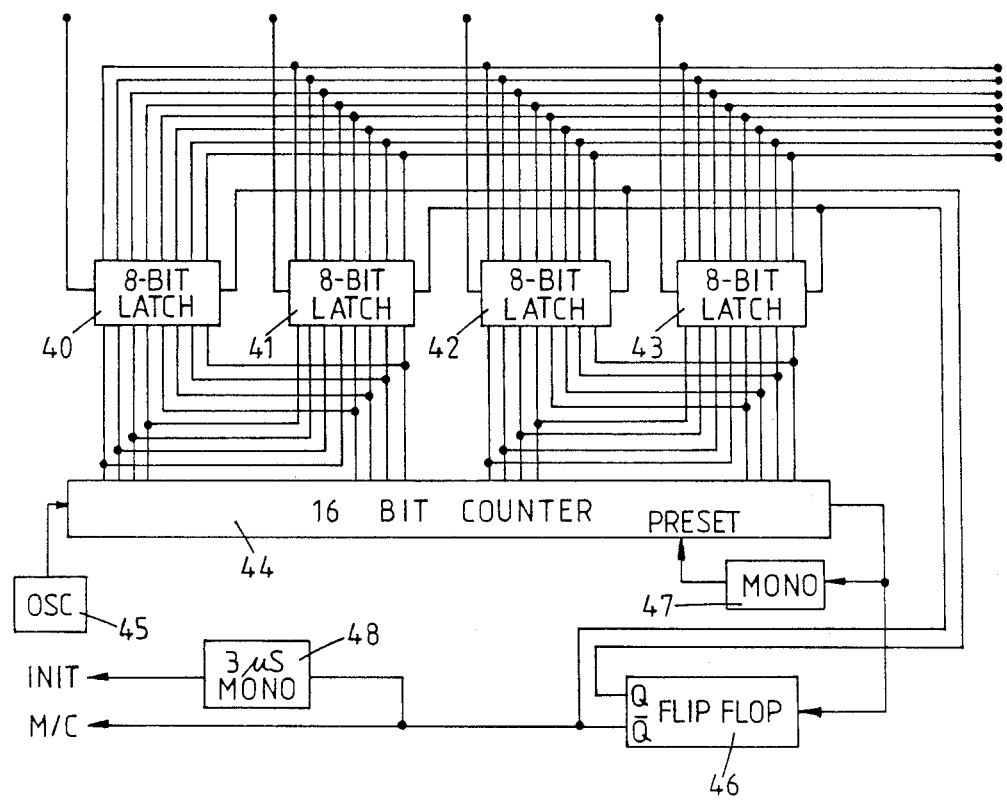
FIG. 6 is a diagram of a pulse generator included in the shown in FIG. 4.
Figure 7:
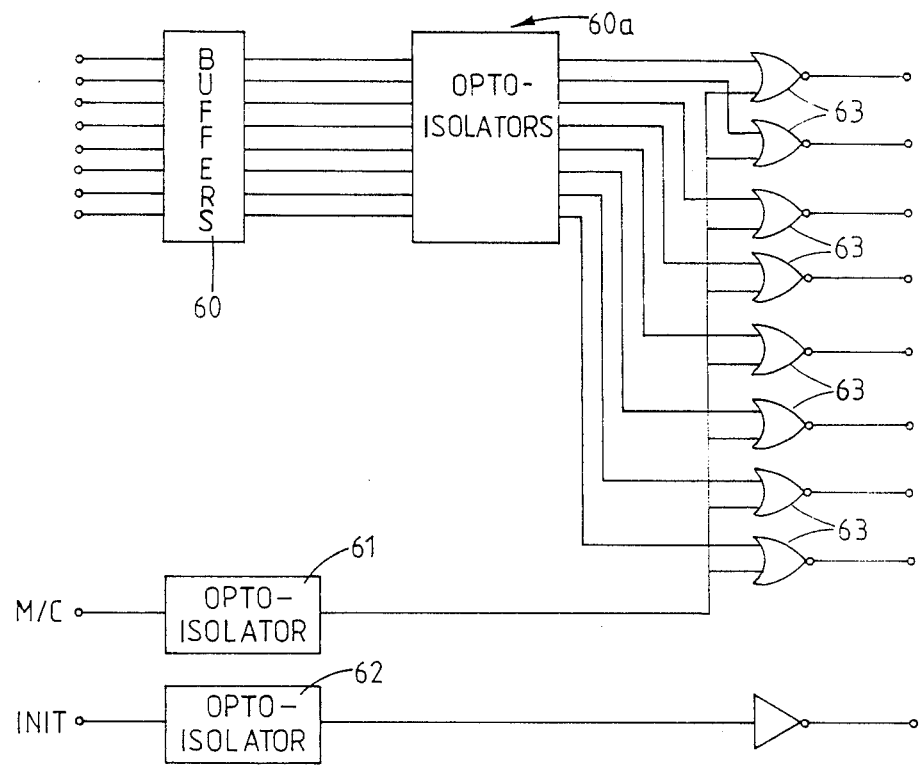
FIG. 7 is a diagram of a current selector circuit.

The digital signals controlling on and off durations are supplied to a digitally controlled pulse generator circuit 37. This circuit, which is shown in more detail in FIG. 6, includes four 8 bit latches 40, 41, 42, 43 which are loaded with the computer output word to store 32 bits of data in total. Latches 40 and 42 are loaded respectively with the lowest and highest 8 bits of a 16 bit data word representing the number of micro-seconds for which the discharge current is required to be on and latches 41 and 43 are likewise loaded with a 16 bit data word representing the off time duration in each cycle. A 16 bit counter 44 is loaded periodically with the on or off time duration word and is counted down to zero by clock pulses from a 1 MHz oscillator 45. At zero count a flip-flop circuit 46 is caused to change state. The Q and $\bar{Q}$ outputs of this flip-flop circuit are connected to terminals of the latches so that the appropriate pair of latches provide outputs to the counter and a monostable circuit 47 provides a signal to a preset terminal of the counter to cause these outputs to be loaded. The $\bar{Q}$ output of the flip-flop circuit 46 provides an M/C pulse and another monostable circuit 48 connected to be triggered by the rising edge of the M/C pulse provides a 3 μS INIT pulse coinciding with the start of each M/C pulse.

A logic circuit 49 receives these M/C and INIT pulses and routes these (under appropriate constraints which are not relevant to this description) to a bank of current control circuits 50 (one for each electrode). Thus, in the present example, everything shown within the box 50 is repeated for each electrode.

Each current control circuit 50 contains a current switch selector circuit 51 which receives an 8 bit data input from a current code circuit 53 (common to all the current control circuits 50) which itself receives an 8 bit current code input from the computer. Each circuit 50 includes a plurality of low voltage current supply switch circuits 54 and a high voltage switch supply circuit 55. The circuits 54 control the connection of a 60 V supply 56 to an output rail 57 and circuit 55 controls the connection of a 300 V supply to the rail 57. The circuits 54 are connected to the rail 57 by resistors 59 of different values so that, by selecting which ones of the circuits 54 are to be energised, the current level can be controlled. For example, the resistors 59 may have values (reading from left to right) of 40 ohms, 20 ohms, 20 ohms, 8 ohms, 8 ohms, and 8 ohms. These are chosen so that, in use, the circuits 54 can pass 1 amp, 2 amps, 2 amps, 5 amps, 5 amps and 5 amps respectively, so that by selecting appropriate combinations every current level from 1 amp to 20 amps in one amp steps can be obtained.

The circuit 51 consists basically of an 8 bit input buffer 60 for the digital input and an opto-isolator 60a for each buffer output. The M/C and INIT signals are also received by the circuit 51. These also drive opto-isolators 61 and 62. The opto-isolator 61 output is connected to the inputs of eight NOR gates 63 which have inputs from respective ones of the individual opto-isolators 60a and the outputs of these gates are used to drive the individual switch circuits 54. The opto-isolator 62 drives the high voltage switch circuit 55.

The opto-isolators are used to isolate the computer and the other control circuits not included in circuit 50 from the switching circuits. This enables the switching circuits to be powered by floating power supplies which are used because there are some conditions in which it is desired to reverse the polarity of the electrodes. The roll 30 is always at earth potential and a reverse polarity switch 65 is used to connect either the rail 57 or a return conductor 65 associated with the supplies 56, 58 to the roll and the other to the electrode. This switch 65 is controlled by the computer 33.

The current code circuit 53 consists basically of an 8 bit latch and buffer. It may include a circuit for disabling the latch output if an RF detector 67 outputs a d.c. signal representing the r.f. picked up near the electrodes and indicating that arcing is occurring instead of the required spark discharge.

For controlling the servo-actuator, a gap voltage detector 67 is provided in each circuit 50. This detector is basically a sample and hole circuit controlled by the logic circuit 49 and providing an opto-coupled output representing the gap voltage for the corresponding electrode at the sampling time. The outputs from the five detectors 67 are supplied to a low wins gate 68 so that the lowest voltage received from the detectors 67 is supplied as a feedback signal to the servo-control for the motor 32. The low wins output is supplied to a comparator 69 which provides a "short-circuit" signal to the logic circuit 49 if the voltage is below a set minimum. The low-wins output is also supplied to a variable gain amplifier 70 which is digitally controlled by an 8 bit signal from the computer 33 and amplifies the error between the low wins output and an adjustable reference voltage. In the event of a short circuit, the logic circuit overrides the variable gain amplifier in the servo-control to cause the electrode holder to move a short distance away from the roll. The M/C pulses are also suppressed for a time. In the absence of a short circuit indication, however, the servo-control acts to move the electrode holder away from the roll if the detected voltage is below the reference level and towards the roll if it is above the reference level. When the voltage is actually at the reference level and there is no error, the spacing of the electrodes from the roll is correct, although in practice the electrode holder will be repeatedly moved in and out, the amplitude of the movement and hence the texture applied to the roll depending on the gain of the variable gain amplifier.

It will be appreciated by the skilled reader that the use of the "low wins" gate arrangement in the servo-feedback loop has the effect of controlling the electrode position such that all the electrodes save the one which is actually in control, are further from the roll than that electrode. The use of the high voltage INIT pulses at the start of each M/C pulse ensures that a discharge is established between each of the electrodes and the roll.

In use, the roll is positioned on the lathe and the slide 29 is then moved to a starting position. The servo-mechanism is initially set up to drive the electrode holder towards the roll until the discharge commences when the normal closed loop operation is initiated. The computer controls the on and off duration for the discharge and the current level during each pulse, as well as determining the gain of the variable gain amplifier in the servo-loop. All these variables can be adjusted by the operator to obtain the surface finish required. The electrode holder is moved along the rotating roll so that the whole surface of the roll is treated.

FIG. 1 shows an electrode holder with a row of rectangular section electrodes arranged in a straight line. Many variations of electrode shape and arrangement are, however, possible. Electrodes could, for example, be of circular or flat section, and they could be arranged in any desired pattern. The use of several electrodes ensures that a good rate of material removal is possible.

Figure 8:
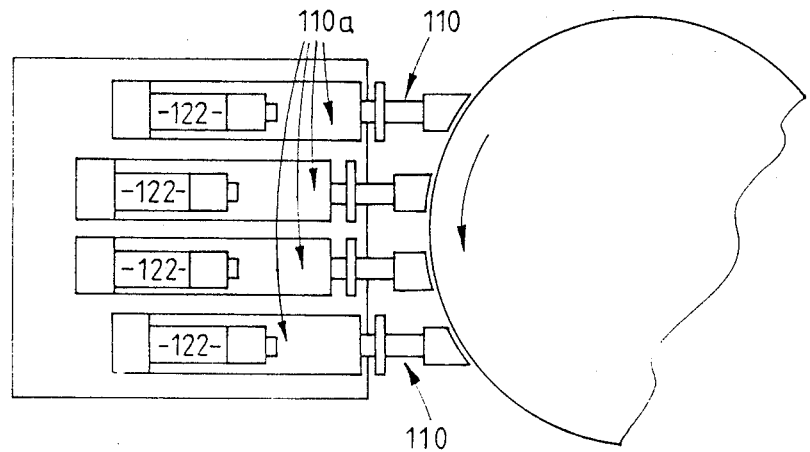
FIG. 8 is a fragmentary view showing another example of the invention.

As shown in FIG. 8, there may be several electrode holders 110 on independently controlled actuators 110a each with its own servo-motor 122 and each having its own distinct servo-control loop as described above.

Other arrangements are possible in which the roll and the electrodes are positioned in a dielectric bath instead of using the nozzles described above.

The control circuits described above are also applicable to more general types of electro-discharge machining as distinct from roll surface treatment. In such cases the circuit of FIG. 6 may be changed to provide a plurality of the INIT pulses during the period of each M/C pulse. In addition the control may include further high voltage switch devices which are energised for the whole duration of each M/C pulse in the event of the discharge failing to be established by the low voltage M/C pulses alone.

I claim:

1. An electro-discharge machining control comprising first and second current sources of relatively high and low voltage respectively, first switch means for repeatedly connecting said second source to an output for a first duration for connection to an electrode and second switch means for repeatedly connecting said first source to said output only when said second source is connected to said output and for a constant duration which is shorter than the first duration of the connection of said second source to the output.

2. An electro-discharge machining control as claimed in claim 1 in which there are provided adjustable on and off time controls for said first switch means.

3. An electro-discharge machining control as claimed in claim 2, in which there are a plurality of said first switch means in series with resistors and a current selector means for determining the total discharge current by selectively operating said plurality of first switch means.

4. An electro-discharge machining apparatus for texture machining the surface of a metal roll comprising:
   roll support means for rotatably supporting a roll for machining;
   a support structure movable in a direction parallel to the roll axis;
   an electrode holder mounted on said support structure and movable relative thereto in a direction transverse to the roll axis;
   a plurality of separate electrodes mounted on said electrode holder and electrically insulated from one another;
   a plurality of first switch means for connecting said electrodes to a source of relatively high voltage;
   a plurality of second switch means for connecting said electrodes to a source of relatively low voltage;
   initiation pulse control means for repeatedly supplying relatively short constant duration initiation pulses to said first plurality of switch means so as to apply relatively short duration relatively high voltage pulses to said electrodes;
   voltage detection means for detecting the voltage across gaps between the electrodes and the roll;
   machining pulse control means for repeatedly supplying relatively long duration machining pulses to said second plurality of switch means so as to apply relatively long duration relatively low voltage pulses to said electrodes;
   machining pulse inhibiting means, responsive to said voltage detecting means, for interrupting the supply of machining pulses to said second plurality of switch means in the event that said voltage detecting means detects a short circuit between an electrode and the roll; and
   actuator means, responsive to said voltage detecting means, for displacing said electrode holder towards and away from the roll surface in accordance with detected discharge conditions.

5. Electro-discharge surface texture machining apparatus for providing a predetermined texture on a surface of a workpiece, comprising:
   at least one electrode holder;

at least one electrode mounted on said electrode holder;

a base structure;

a workpiece support;

means mounting said electrode holder and said workpiece support on said base structure for scanning movement of said electrode over a surface of a workpiece to be texture machined;

current pulse supply means for supplying pulses of machining current to said electrode, said current pulse supply means comprising:

(a) a source of relatively low voltage machining pulses of predetermined frequency and of predetermined duration;

(b) adjustment means for adjusting the frequency and duration of said machining pulses; and (c) a source of relatively high voltage initiation pulses of a fixed duration, where said fixed duration is short relative to the machining pulse duration, said initiation pulses coinciding with the commencement of each of said machining pulses; and means sensitive to discharge conditions for adjusting the proximity of the electrode to the surface.

6. An electro-discharge surface texture machining apparatus as claimed in claim 5 wherein said low voltage source comprises:

a low voltage supply;

a first switch for connecting said low voltage supply to the electrode; and a first timing circuit controlling said first switch; and said high voltage source comprises:

a high voltage supply;

a second switch connecting said high voltage supply to the electrode; and a second timing circuit controlling said second switch, said second timing circuit being triggered into operation for said fixed duration each time the first timing circuit provides a control pulse to said first switch.

7. An electro-discharge surface texture machining apparatus as claimed in claim 6 in which said first timing circuit comprises:

a presettable counter;

means for loading the counter periodically with count values representing the required on duration of the first switch alternatively with count values representing the required off duration of the first switch;

a clock pulse source for clocking said counter; and means, sensitive to the counter count state, for alternately turning said first switch on and off.

8. An electro-discharge surface texture machining apparatus as claimed in claim 7 in which said second timing means comprises a monostable circuit triggered by said first timing means.

9. An electro-discharge surface texture machining apparatus as claimed in claim 8 in which said counter is a 16 bit counter, said clock provides clock pulses at a frequency of 1 MHz and said monostable circuit provides a 3 $\mu$S pulse duration.

10. An electro-discharge surface texture machining apparatus as claimed in claim 5 further comprising:

gap voltage sensing means; and machining pulse inhibition means for inhibiting a machining pulse in response to said gap voltage sensing means detecting a short circuit condition.

11. An electro-discharge surface texture machining apparatus as claimed in claim 6 in which said low-voltage source comprises:

a plurality of said first switches; and a plurality of resistor means for connecting said switches to said electrode and for providing a plurality of separately switchable machining current paths in parallel with one another.

12. An electro-discharge surface texture machining apparatus as claimed in claim 11 further comprising selection means for selecting different combinations of said first switch means for operation during said machining pulses, so as thereby to determine the level of machining current.

13. An electro-discharge surface texture machining apparatus for providing a predetermined texture on a surface of a workpiece, comprising:

a base structure;

means supporting a workpiece on said base structure;

a carriage mounted on said base structure;

a plurality of electrode holders mounted on said carriage;

a plurality of electrodes mounted on said electrode holders;

transport means for said carriage and said workpiece support means for systematically scanning each of said electrodes over the whole surface of a workpiece to be texture machined;

a plurality of feed means for independently moving respective electrode holders relative to the carriage towards and away from the workpiece surface along spaced paths transverse to the scanning motion of the electrodes relative to the workpiece; and means for supplying discharge current pulses to each of said electrodes;

each of said feed means comprising an independent servo-drive including:

a sensing device for sensing a discharge condition at the corresponding electrode; and a closed loop control means for moving the associated electrode holder in response to said sensing device.

14. An electro-discharge surface texture machining apparatus as claimed in claim 13 in which said workpiece is a roll and said transport means includes means for rotating the roll about its axis and further means for displacing said carriage in a direction parallel to said axis, said feed means being arranged to displace the respective electrodes substantially radially relative to the roll.

15. An electro-discharge surface texture machining apparatus as claimed in claim 14 in which said electrode holders are spaced circumferentially around the roll axis in a plane perpendicular to the roll axis.

16. An electro-discharge surface texture machining apparatus as claimed in claim 13 in which there are a plurality of electrodes on each electrode holder, said electrodes being individually electrically insulated from the electrode carriers and each being associated with a separate independent machining current pulse supply.

* * * * *